United States Patent
Logan et al.

(10) Patent No.: US 10,086,693 B2
(45) Date of Patent: Oct. 2, 2018

(54) FUEL CAP BARRIER KIT

(71) Applicant: Nissan North America, Inc., Franklin, TN (US)

(72) Inventors: Derek James Logan, Chandler, AZ (US); Michael Betts, Tempe, AZ (US); Thomas Scott Dennis, Phoenix, AZ (US); Elwyn Jones, Chandler, AZ (US); Roman Pense, Maricopa, AZ (US)

(73) Assignee: Nissan North America, Inc., Franklin, TN (US)

( * ) Notice: Subject to any disclaimer, the term of this patent is extended or adjusted under 35 U.S.C. 154(b) by 131 days.

(21) Appl. No.: 15/182,159

(22) Filed: Jun. 14, 2016

(65) Prior Publication Data

US 2017/0355262 A1    Dec. 14, 2017

(51) Int. Cl.
*B60K 15/05* (2006.01)

(52) U.S. Cl.
CPC ........ *B60K 15/05* (2013.01); *B60K 2015/053* (2013.01); *B60K 2015/0523* (2013.01); *F01N 2610/1413* (2013.01)

(58) Field of Classification Search
CPC .. B60K 15/05; B60K 2015/053; B60K 13/04; F01N 2610/1413
USPC ..................................................... 296/97.22
See application file for complete search history.

(56) References Cited

U.S. PATENT DOCUMENTS

| | | | | |
|---|---|---|---|---|
| 4,811,984 A | * | 3/1989 | Hempel | B60K 15/05 296/202 |
| 5,062,541 A | * | 11/1991 | Galbo | B60K 15/04 215/203 |
| 7,051,772 B2 | * | 5/2006 | Dillon | B60K 15/04 141/94 |
| 2009/0145903 A1 | * | 6/2009 | Soltis | B60K 15/0406 220/288 |
| 2010/0012205 A1 | * | 1/2010 | Vandervoort | B60K 15/0406 137/588 |

FOREIGN PATENT DOCUMENTS

| | | | | |
|---|---|---|---|---|
| FR | 3024964 A1 | * | 2/2016 | ............. B60K 13/04 |
| FR | 3028457 A1 | * | 5/2016 | ............. B60K 13/04 |
| JP | 2008254508 A | * | 10/2008 | |

OTHER PUBLICATIONS

U.S. Appl. No. 15/010,230; Filling System; Scott Dennis; filed Jan. 29, 2016.

* cited by examiner

*Primary Examiner* — Pinel E Romain

(57) ABSTRACT

A fuel cap barrier kit is basically provided with a movable barrier and an attachment member. The movable barrier is dimensioned and structured to be attached to a vehicle body at a location in which the movable barrier is disposed in front of a fuel cap and is underneath a filler compartment door. The movable barrier is movable between an inlet accessible position in which the movable barrier permits user access to the fuel cap and an inlet blocking position in which the movable barrier is disposed in front of the fuel cap. The attachment member is configured to fixedly attach the movable barrier to the vehicle body.

17 Claims, 9 Drawing Sheets

United States Patent US 10,086,693 B2

FUEL CAP BARRIER KIT

BACKGROUND

Field of the Invention

The present invention generally relates to a fuel cap barrier kit. More specifically, the present invention relates to a fuel cap barrier kit having a movable barrier for a vehicle filler compartment.

Background Information

Diesel vehicles are well known for being highly durable and fuel efficient. However, in order to meet modern emissions requirements, many diesel vehicles employ systems that use an additional fluid such as diesel exhaust fluid (DEF) which is added to the exhaust of diesel engines to reduce emissions. DEF is a non-hazardous solution that is generally 32.5% urea and 67.5% de-ionized water. DEF is sprayed into the exhaust stream of the diesel vehicle to breakdown dangerous NOx emissions into harmless nitrogen and water. Engine systems that employ the addition of DEF use a Selective Catalytic Reduction to spray DEF into the exhaust stream. DEF is not a fuel additive and should not come into contact with diesel fuel. Thus, DEF is stored in a separate tank from the fuel tank. Also to avoid confusion with the fuel tank filler inlet, the DEF tank filler inlet typically has a blue filler cap.

SUMMARY

In some diesel vehicles, the fuel tank filler inlet and the DEF tank filler inlet are provided next to each other. With such an arrangement of the fuel tank filler inlet and the DEF tank filler inlet, a person may accidently add DEF into the fuel tank. When DEF is introduced into the diesel fuel system and contacts the diesel fuel, DEF can be extremely aggressive and will crystalize. Even limited amounts of DEF can destroy the fuel system integrity and compromise major engine components.

In view of the state of the known technology, one aspect of the present disclosure is to provide a fuel cap barrier kit that comprises of a movable barrier and an attachment member. The movable barrier is dimensioned and structured to be attached to a vehicle body at a location in which the movable barrier is disposed in front of a fuel cap and is underneath a filler compartment door. The movable barrier is movable between an inlet accessible position in which the movable barrier permits user access to the fuel cap and an inlet blocking position in which the movable barrier is disposed in front of the fuel cap. The attachment member is configured to fixedly attach the movable barrier to the vehicle body.

Another aspect of the present disclosure is to provide a vehicle body comprising vehicle body panel, a movable barrier and an attachment member. The vehicle body panel includes a filler compartment having a first filler inlet with a first cap, a second filler inlet with a second cap and a compartment door. The compartment door is movably arranged between a closed position overlying the first and second caps and an open position exposing the first and second caps. The movable barrier is attached to the vehicle body panel and disposed underneath the filler compartment door when the door is in the closed position. The movable barrier is movable between an inlet accessible position in which the movable barrier permits user access to the first cap and an inlet blocking position in which is disposed in front of the first cap. The attachment member fixedly attaches the movable barrier to the vehicle body panel.

BRIEF DESCRIPTION OF THE DRAWINGS

Referring now to the attached drawings which form a part of this original disclosure.

DETAILED DESCRIPTION OF EMBODIMENTS

Figure 1:
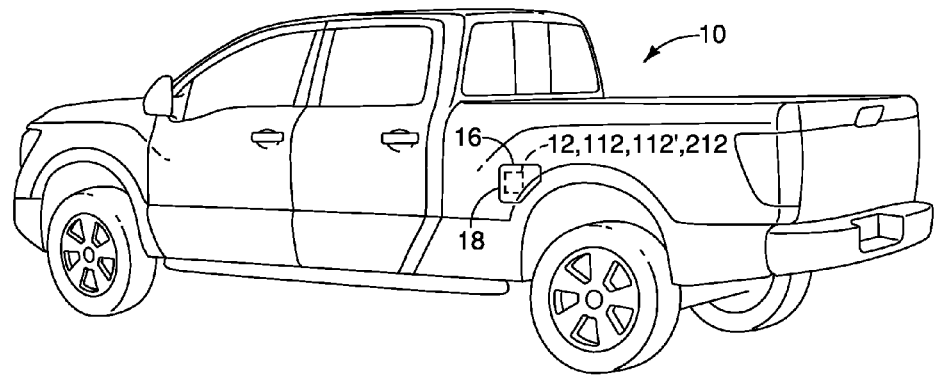
FIG. 1 is a rear perspective view of a diesel vehicle having a movable barrier disposed in a filler compartment in accordance with a first embodiment.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring initially to FIGS. 1 to 5, a diesel vehicle 10 is illustrated that is equipped with the present invention. While the diesel vehicle 10 is illustrated as a pickup truck, it will be apparent to those skilled in the art from this disclosure that the present invention can be applied to other vehicles as needed and/or desired. The diesel vehicle 10 will herein after be simply referred to as "the vehicle 10" for the sake of brevity. In order to avoid accidently adding diesel exhaust fluid (DEF) into a fuel diesel tank (not shown) of the vehicle 10, a movable barrier 12 is installed on the vehicle 10 in accordance with the present invention. The movable barrier 12 is designed to add a step into the user thought process so as to make a user to think twice before adding a fluid into the fuel tank of the vehicle 10. As explained below, the movable barrier 12 forces the user to move the movable barrier 12 before a fluid can be added into the diesel fuel tank of the vehicle 10. In this way, it is less likely that a user will add DEF into the diesel fuel tank of the vehicle 10.

Other than the addition of the movable barrier 12, the vehicle 10 can be any diesel vehicle that includes a fluid filler inlet for adding an additive that is not to be mixed with the fuel in the diesel fuel tank of the vehicle. Accordingly, the structure of the vehicle 10 will only be discuss as needed to understand the application of the movable barrier 12 to the vehicle 10. The vehicle 10 comprises, among other things, a body panel 14 having a filler compartment 16 and a filler compartment door 18. The filler compartment 16 is a recessed portion of the body panel 14. The filler compartment 16 has one end of a first filler inlet tube 20 attached to the filler compartment 16. A first filler cap 20a is tethered to the filler compartment door 18 by a tether T and screws into the end of the first filler inlet tube 20. The filler compartment 16 further has one end of a second filler inlet tube 22 attached to the filler compartment 16. A second filler cap 22a screws into the end of the second filler inlet tube 22. In the first embodiment, the other end of the first filler inlet tube 20 is connected to the diesel fuel tank. Thus, the first filler inlet tube 20 is configured to receive diesel fuel. The other end of the second filler inlet tube 22 is connected to a DEF tank (not shown). Thus, the second filler inlet tube 22 is configured to receive diesel exhaust fluid (DEF). The filler compartment door 18 is movably arranged (e.g., hinged) between a closed position and an open position in a conventional manner. In the closed position, the filler compartment door 18 overlies the first and second filler inlet tubes 20 and 22. In the open position, the filler compartment door 18 exposes the first and second filler inlet tubes 20 and 22 so that they are accessible to a user to add the appropriate fluid. Preferably, when the filler compartment door 18 is closed, the filler compartment door 18 forms a smooth surface with the exterior of the vehicle 10.

Now the movable barrier 12 will be discussed in more detail. In this first embodiment of FIGS. 2 to 5, the movable barrier 12 can be preinstalled by the vehicle manufacturer as part of a new vehicle, or can be installed as a dealer accessory or an aftermarket added-on. As illustrated in FIG. 5, the movable barrier 12 can be part of a fuel cap barrier kit K1 that is configured to be installed on the vehicle 10 as described below. For example, the fuel cap barrier kit K1 includes the movable barrier 12 and an attachment member 24 (shown as a strip of the double-sided tape 30 with a pair of release sheets 31). The fuel cap barrier kit K1 has a container C, which is diagrammatically illustrated by dashed lines enclosing the movable barrier 12 and the attachment member 24.

In the first embodiment, the movable barrier 12 is dimensioned and structured to be attached to the vehicle 10 inside the filler compartment 16 by the double-sided tape 30 of the attachment member 24. Preferably, the movable barrier 12 is dimensioned and structured to be attached to the body panel 14 such that the movable barrier 12 is disposed underneath the filler compartment door 18 when the filler compartment door 18 is in the closed position. In this way, the movable barrier 12 is protected by the filler compartment door 18 and the exterior appearance of the vehicle 10 is not affected.

As mentioned above, since the first filler inlet tube 20 that receives diesel fuel is typically located adjacent the second filler inlet tube 22 that receives DEF, there is a possibility for DEF to be mistakenly added to the first filler inlet tube 20. In particular, DEF does not need to be added as frequently as diesel fuel. As a result, when the user seeks to pump DEF into the vehicle 10 on the infrequent occasion, the user may mistakenly pump DEF into the first filler inlet tube 20 as a matter normal routine instead of into the second filler inlet tube 22. When DEF is added to the first filler inlet tube 20, the DEF will crystalize the diesel fuel, destroying the fuel system integrity and compromising major engine components.

As mentioned above, the movable barrier 12 is provided to introduce a step into the user thought process of a fuel filling routine to prevent the user from accidently pumping DEF fuel into the wrong filler inlet. That is, the movable barrier 12 provides an additional fuel filling step to induce the user to be more cognizant of the type of fluid (diesel fuel or DEF) that is being added to the first filler inlet tube 20. Specifically, the placement of the movable barrier 12 in front of the first filler cap 20a requires the user to move the movable barrier 12 out of the way to access the first filler cap 20a. This additional step induces the user to reassess whether the fluid being pumped is diesel fuel or DEF before pumping the fluid into the first filler inlet tube 20.

Figure 3:
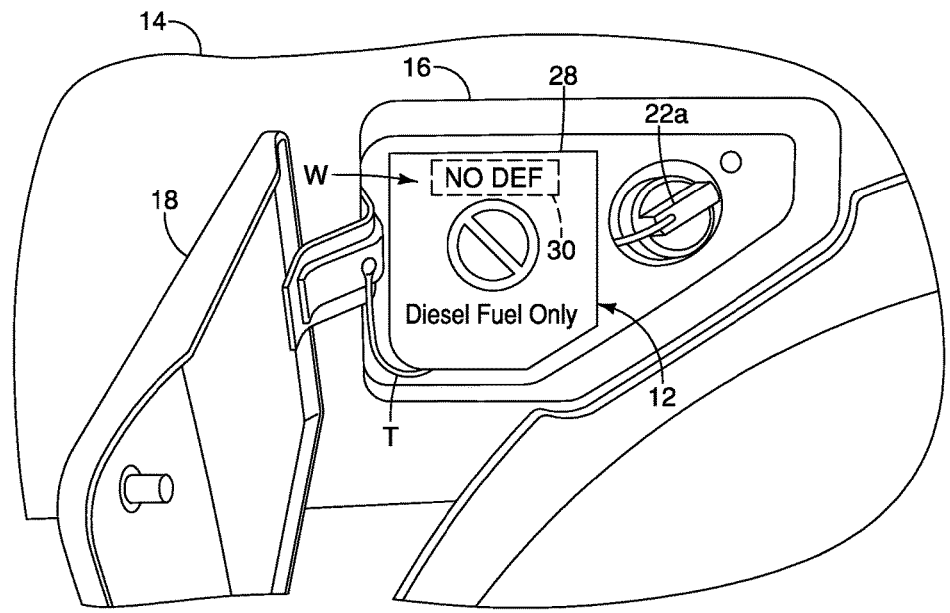
FIG. 3 is a partial elevational view, similar to FIG. 2, of the side portion of the diesel vehicle illustrated in FIGS. 1 and 2, with the filler compartment door open and the movable barrier disposed in the filler compartment in an inlet blocking position.
Figure 4:
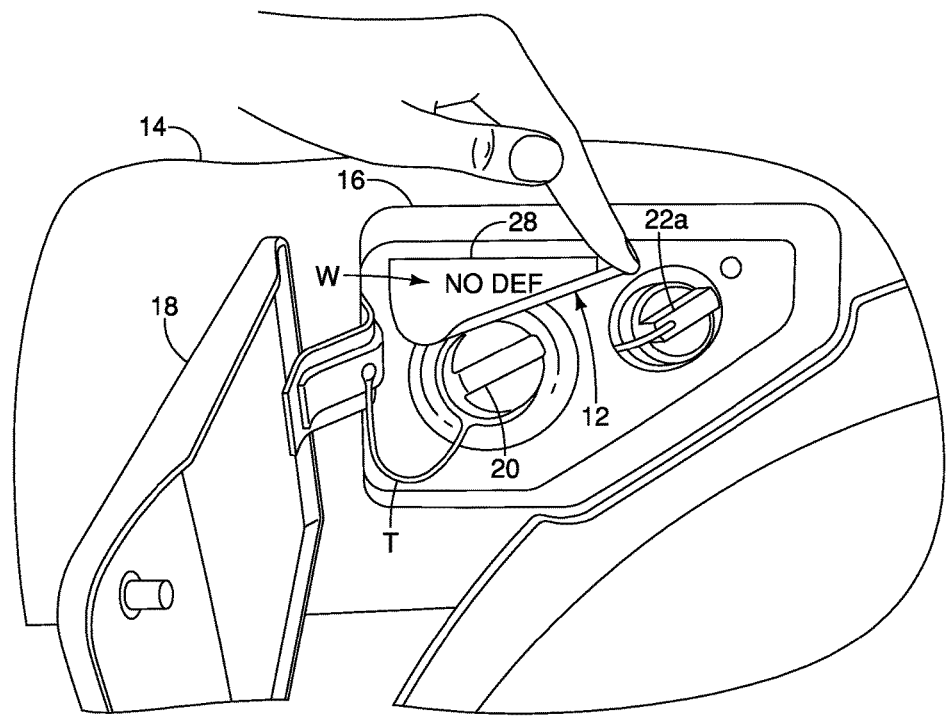
FIG. 4 is a partial elevational view, similar to FIGS. 2 and 3, of the side portion of the diesel vehicle illustrated in FIGS. 1 to 3, but with the movable barrier manually moved to an inlet accessible position.
Figure 5:
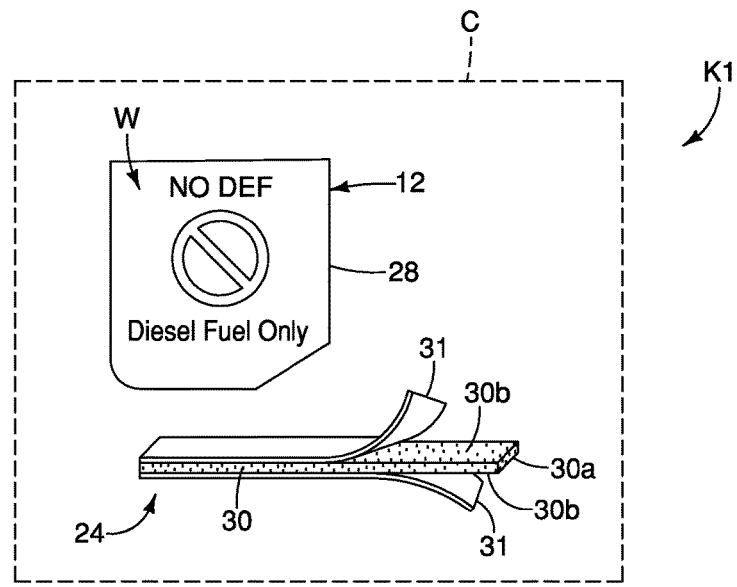
FIG. 5 is a simplified diagrammatic view of a fuel cap barrier kit having the movable barrier illustrated in FIGS. 1 to 4 and an attachment member for installing the movable barrier to a vehicle.

Thus, as best seen in FIGS. 3 and 4, the movable barrier 12 is movable by the user between an inlet accessible position and an inlet blocking position. The movable barrier 12 permits user access to the first filler cap 20a in the inlet accessible position, and is disposed in front of the first filler cap 20a in the inlet blocking position. Thus, the inlet accessible position corresponds to a user operated position and the inlet blocking position corresponds to a rest position of the movable barrier 12. Preferably, the movable barrier 12 cannot be maintained in the inlet accessible position without user input. In other words, the movable barrier 12 is preferably attached to the filler compartment 16 such that the user must continuously hold the movable barrier 12 in the inlet accessible position to pump to access the first filler cap 20a. By requiring the user to continuously maintain the movable barrier 12 in the filler accessible position, the user is induced to be more cognizant about the type of fuel being pumped into the first filler inlet 20. For example, DEF is typically added to the vehicle 10 from a 2.5 gallon container and it would be difficult for the user to add DEF to the first filler inlet 20 while also maintaining the movable barrier 12 out of the way. Thus, the configuration and placement of the movable barrier 12 adds difficulty and complexity for the user who is mistakenly pumping DEF into the first filler inlet 20.

The movable barrier 12 is preferably attached to a surface of the filler compartment 16 in a vicinity (e.g., attachment area A in FIG. 2) of the first filler cap 20a such that the movable barrier 12 is disposed in front of the first filler cap 20a. As shown in FIG. 3, the movable barrier 12 overlies the first filler cap 20a when it is attached to the body panel 14. Preferably, the movable barrier 12 is disposed in front of the first filler cap 20a and not in front of the second filler cap 22a when the movable barrier 12 is in the rest position (i.e., the inlet blocking position). In this manner, the first and second filler caps 20a and 22a are further distinguished to help remind the user that their respective filler inlet tubes 20 and 22 are configured to receive different types of fuel.

As shown, the movable barrier 12 according to the first embodiment includes a flexible sheet material 28. The flexible sheet material 28 is preferably constructed of rubber or a flexible woven material impregnated with carbon so that the flexible sheet material 28 does not conduct electricity. As such, the flexible sheet material 28 of the movable barrier 12 of the first embodiment is configured as a curtain that is to be lifted by the user to access the first filler cap 20a. Alternatively, the movable barrier 12 can be constructed of a fabric material and configured to be movable similar to vertical blinds. It will be apparent to one skilled in the art from this disclosure that the movable barrier 12 can be constructed of a variety of types of flexible material that does not conduct electricity.

In the first embodiment as shown, the movable barrier 12 includes warning indicia W indicative of a warning message to a user. The warning indicia W preferably indicates to the user that the first filler inlet tube 20 is configured to receive diesel fuel only to remind the user not to pump DEF into the first filler inlet tube 20. The warning indicia W can include one or more languages, preferably stating "NO DEF." Of course, it will be apparent to one skilled in the art from this disclosure that the warning indicia W can also simply include pictorial representations indicating that the first filler inlet tube 20 should only receive diesel fuel. The warning indicia W can be fixed to the movable barrier 12 by being embossed or recessed onto the flexible sheet material 28. Alternatively, the warning indicia W can be disposed on an additional sheet or label (not shown) that is fixed to the movable barrier 12. It will also be apparent to one skilled in the art from this disclosure that the warning indicia W can also be disposed directly on the body panel 14, such as on the filler compartment door 18 or on the surface of the filler compartment 16 in the vicinity of the first and second filler caps 20a and 22a.

Figure 2:
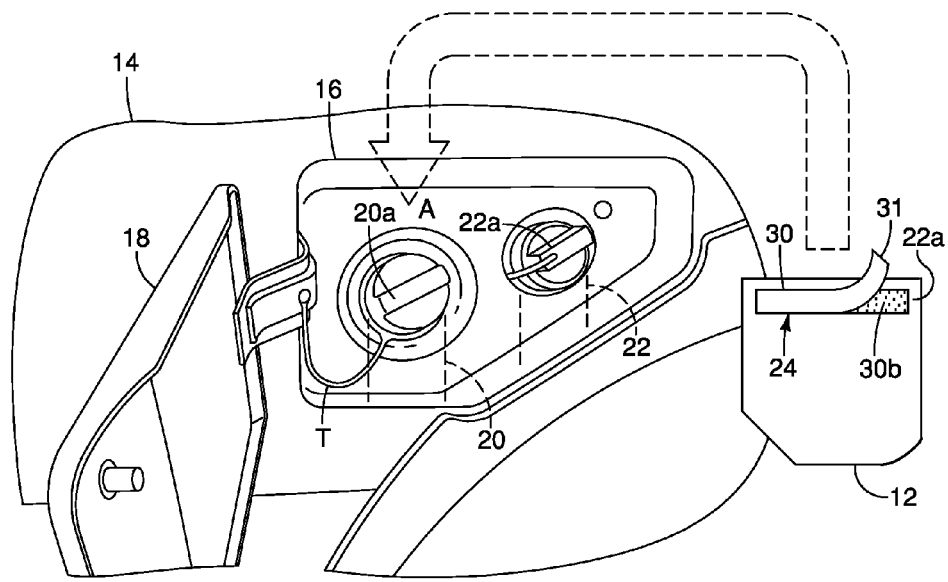
FIG. 2 is a partial elevational view of a side portion of the diesel vehicle illustrated in FIG. 1, with a filler compartment door opened to show the filler compartment and prior to installation of the movable barrier.

Preferably, the movable barrier 12 is secured to the filler compartment surface (the attachment area A) by the attachment member 24. In other words, the attachment member 24 fixedly attaches the movable barrier 12 to the body panel 14. In the first embodiment, the attachment member 24 includes the double-sided tape 30 as mentioned above, but is not limited to the illustrated attachment member. As best seen in FIG. 5, the double-sided tape 30 includes a base layer 30a having two adhesive surfaces 30b that are each overlaid by one of the release sheets 31. Additionally, it is also preferable that the double-sided tape 30 is pre-attached to the flexible sheet material 28 of the movable barrier 12, as shown in FIG. 2. In other words, the base layer 30a is pre-attached to the movable barrier 12 with only one release sheet 30c overlaid on an adhesive surface 30b of the base layer 30a to be removed by the user. Thus, the attachment member 24 includes an adhesive for attaching the movable barrier 12 (i.e., the flexible sheet material 28) to the vehicle 10. In the first embodiment, the adhesive is provided on a backing material (i.e., the base layer 30a) to form the double-sided tape 30. Alternatively, the adhesive can be applied as glue onto the movable barrier 12 directly. It will be apparent to those skilled in the art that the movable barrier 12 can also be affixed to the body panel 14 via a variety of fastening members such as screws, studs or clips.

As shown, the attachment member 24 attaches an upper portion 12a of the movable barrier 12 to the filler compartment 16 that that is adjacent to the first filler cap 20a, as best seen in FIG. 2. In the first embodiment, the double-sided tape 30 is applied to the upper portion 12a of the movable barrier 12. As a result, the movable barrier 12 of the first embodiment is lifted by the user in an upward direction, as shown in FIG. 4. It will be apparent to those skilled in the art from this disclosure that the attachment member 24 can attach the movable barrier 12, or be applied to the movable barrier 12, at a bottom portion or at one of the lateral side portions of the movable barrier 12, as needed and/or desired. As such, the movable barrier 12 can be moved by the user in a sideways or downward direction.

The movable barrier 12 does not need to be pre-mounted to the vehicle 10 as mentioned above. Instead, as illustrated in FIG. 5, the movable barrier 12 can be part of the fuel cap barrier kit K1 that is configured to be assembled to the vehicle 10 as described above. For example, the fuel cap barrier kit K1 can include the movable barrier 12 and the attachment member 24 (shown as a strip of the double-sided tape 30) in the container C enclosing the movable barrier 12 and the attachment member 24. It will also be apparent to those skilled in the art from this disclosure that the kit K1 can also include a bottle of glue, screws, clips, and other types of fastening members as being the attachment member 24 for the movable barrier 12.

Referring now to FIGS. 6 to 11, a movable barrier 112 in accordance with a second embodiment will now be discussed. The movable barrier 112 of the second embodiment is also configured to be attached to the body panel 14 of the vehicle 10 for selectively blocking access to the first filler cap 20a similar to the first embodiment. Thus, for simplicity, components of the body panel 14 of the second embodiment will receive identical reference numerals as the first embodiment. Components of the movable barrier 112 having corresponding components in the movable barrier 12 will receive the same numbers but increased by 100.

Figure 6:
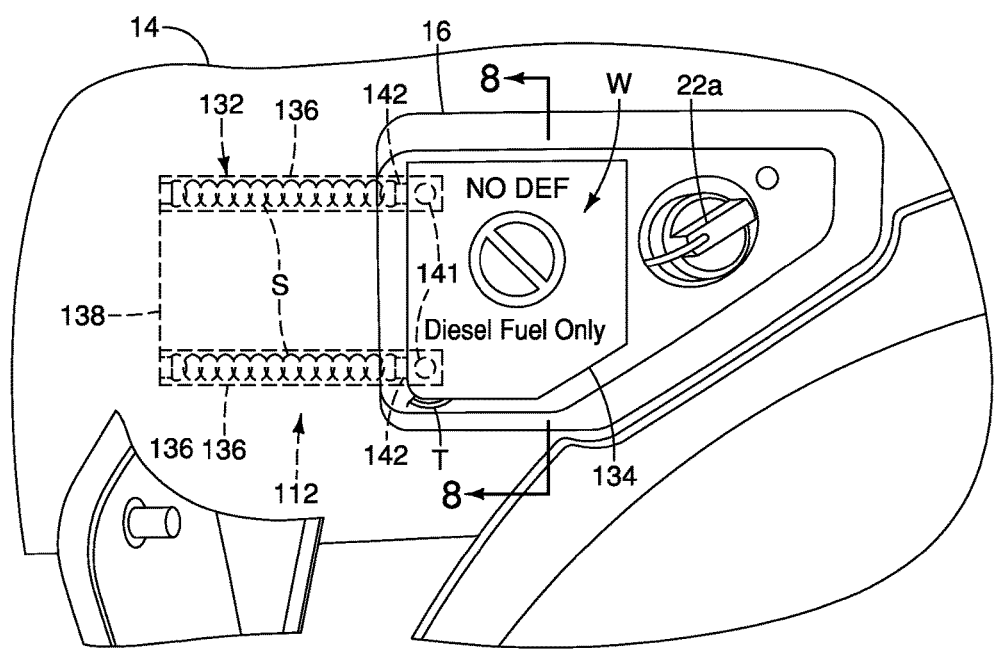
FIG. 6 is a partial elevational view of the side portion of the diesel vehicle illustrated in FIGS. 1 to 4, but with the diesel vehicle being modified to be equipped with a movable barrier in accordance with a second embodiment, and the movable barrier being disposed in the filler compartment in an inlet blocking position.
Figure 7:
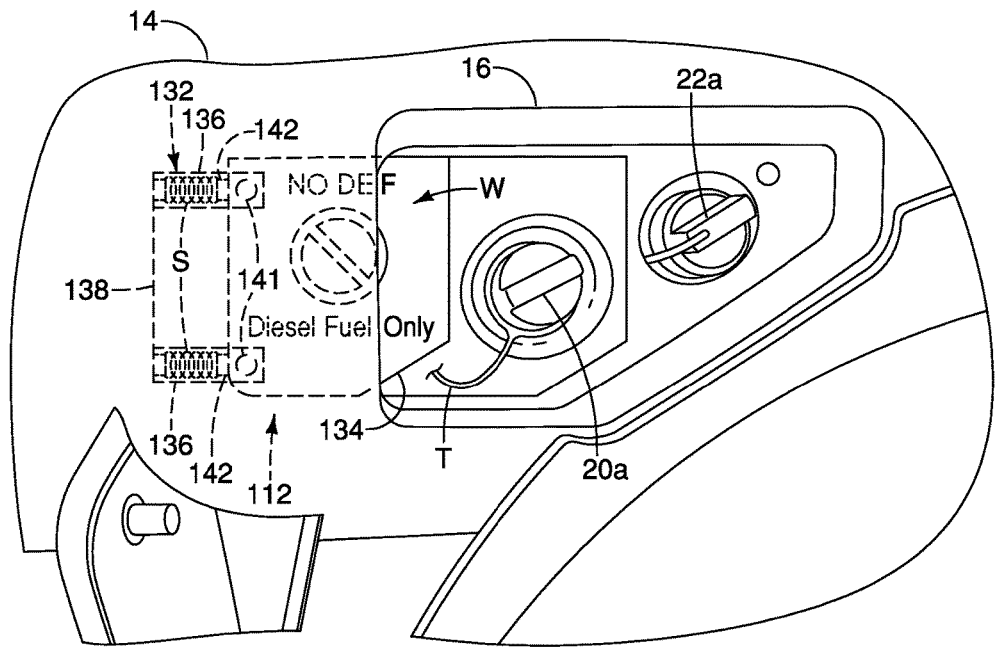
FIG. 7 is a partial elevational view, similar to FIG. 6, of the side portion of the diesel vehicle, but with the movable barrier being in an inlet accessible position.
Figure 8:
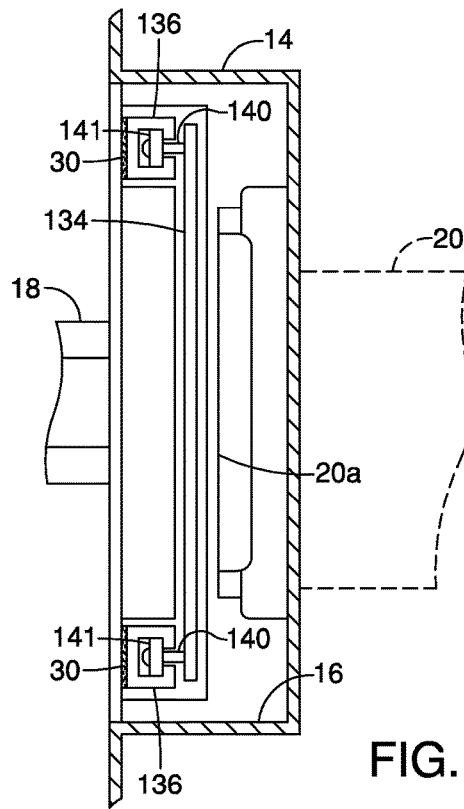
FIG. 8 is a simplified partial cross sectional view of the filler compartment of the diesel vehicle as seen along section line 8-8 of FIG. 6 with the movable barrier and the fuel filler cap shown in elevation.

The movable barrier 112 of the second embodiment includes a spring-loaded assembly having a base 132 and a barrier member 134. The base 132 is configured to be mounted to the body panel 14, preferably on a non-exposed surface of the body panel 14. In other words, the barrier member 134 is configured to be partially disposed beneath the body panel 14 of the vehicle 10. As seen in FIGS. 6 and 7, the base 132 of the movable barrier 112 is partially disposed in a cavity (not shown) of the vehicle 10. The attachment of the movable barrier 112 to the body panel 14 will be further discussed below. The base 132 movably supports the barrier member 134 such that the filler compartment door 18 overlies the movable barrier 112 when the filler compartment door 18 is in the closed position. The barrier member 134 is slidable with respect to the base 132 between an operated position and a rest position. The barrier member 134 is biased to overlie the first filler cap 20a in the rest position, as further explained below.

The barrier member 134 is movable with respect to the base 132 between the inlet accessible position and the inlet blocking position. The inlet accessible position corresponds to the operated position (FIG. 6) and the inlet blocking position corresponds to the rest position (FIG. 7) of the movable barrier 112. Similar to the first embodiment, the barrier member 134 is disposed in front of the first filler cap 20a in the inlet blocking position, and is moved into the inlet accessible permission to permit access to the first filler cap 20a. In the second embodiment, the base 132 is configured as a support for the barrier member 134 in which the barrier member 134 moves with respect to the support. Similar to the first embodiment, the barrier member 134 is preferably disposed in front of the first filler cap 20a and not the second filler cap 22a when the barrier member 134 is in the rest position.

The base 132 is a rigid structure that includes a pair of identical channels 136 connected by a connecting member 138. In the second embodiment, each of the channels 136 includes a biasing element S to bias the barrier member 134 into the rest position in front of the first filler cap 20a. Preferably, the biasing elements S are compression springs. It will be apparent to those skilled in the art from this disclosure that the first and second biasing elements S can be a variety of different types of biasing elements, as needed and/or desired.

The barrier member 134 is a rigid slidable member that includes a pair of shafts 140 and a pair of rollers 141 forming a pair of guide members. The rollers 141 are disposed in the channels 136 so that the barrier member 134 is movable along the channels 136. Thus, in the second embodiment, the barrier member 134 includes a rigid slidable member. The barrier member 134 further includes a pair of protrusions 142. The protrusions 142 are located adjacent to the shafts 140. The protrusions 142 abut the biasing elements S. In this way, the biasing elements S of the base 132 are operatively arranged to bias the barrier member 134 to overlie the first filler cap 20a of the first filler inlet tube 20. Thus, the base 132 includes at least one biasing element S that is configured to bias the barrier member 134 into the inlet blocking position when the movable barrier 112 is attached to the vehicle 10. It will be apparent to one skilled in the art that the base 132 can be configured to include just a single channel that receives one guide member of the barrier member 134 as needed and/or desired.

The biasing elements S are arranged in the channels 136 so that the biasing elements S contact the connecting member 138 and the protrusions 142 of the barrier member 134. When the movable barrier 112 is assembled to the vehicle 10, the biasing elements S bias the barrier member 134 towards the inlet blocking position. To access the fuel nozzle, the user slides the barrier member 134 with respect the base 132, compressing the biasing elements S so that the movable barrier 112 is moved into the inlet accessible position.

Preferably, the barrier member 134 includes warning indicia W indicative of a warning message to the user that the first filler inlet tube 20 is configured to receive diesel fuel only. The warning indicia W can be fixed to the barrier member 134 by being recessed or molded onto the barrier member 134. Alternatively, the warning indicia W can be disposed on an additional sheet or label that is fixed to the barrier member 134. It will also be apparent to one skilled in the art from this disclosure that the indicia W can also be disposed directly on the body panel 14, such as on the filler compartment door 18 or on the surface of the filler compartment 16 in the vicinity of the first and second filler caps 20a and 22a.

The base 132 and the barrier member 134 are preferably constructed of a rigid material with a low electrical conductivity such as carbon impregnated plastic and the like. Thus, the channels 136 and the connecting member 138 are preferably constructed of a carbon impregnated plastic. The attachment member 24 can be affixed to any one or all of the channels 136 and the connecting member 138. The attachment of the base 132 to the vehicle 10 will be further discussed below.

As previously stated, the movable barrier 112 of the second embodiment is configured to be partially disposed beneath the body panel 14 of the vehicle 10. As seen in FIGS. 6 and 7, the base 132 of the movable barrier 112 is partially disposed in a cavity (not shown) of the body panel 12 that is located laterally adjacent to the filler compartment 16. In particular, the connecting member 138 and the channels 136 are mounted onto internal surfaces (not shown) of the cavity while the channels 136 partially extend from the cavity into the filler compartment 16. The barrier member 134 slides laterally along the channels 136 to move from the filler compartment 16 into the cavity between the inlet blocking position and the inlet accessible position.

As stated above, the movable barrier 112 further includes two of the attachment members 24 that were discussed above. The base 132 is configured to be attached to the body panel 14 by the attachment member 24. In the second embodiment as shown, the attachment member 24 includes an adhesive for attaching the barrier member 134 to the body panel 14. Preferably, the adhesive includes the double sided-tape 30 that is pre-attached to the base 132. For example, the base layer 30a of the double sided-tape 30 can be pre-applied to the connecting member 138, and also to the first and second channels 136, with one of the release sheets 31 disposed on the adhesive surface 30b to be removed by the user as necessary. It will be apparent to those skilled in the art that the adhesive can also include glue that is directly applied to the base 132. The attachment member 24 can further include screws, studs or clips that attach the base 132 to the vehicle 10.

Figure 9:
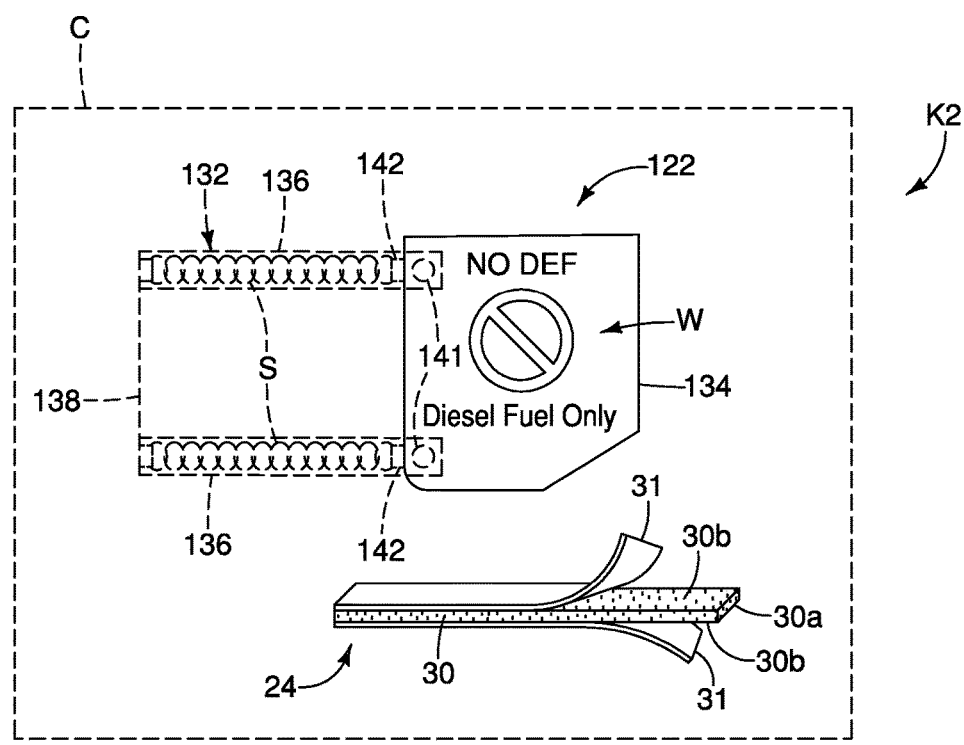
FIG. 9 is a simplified diagrammatic view of a fuel cap barrier kit having the movable barrier illustrated in FIGS. 6 to 8 and a pair of attachment members for installing the movable barrier to a diesel vehicle.

As illustrated in FIG. 9, the movable barrier 112 can be part of a kit K2 that is to be assembled to the body panel 14 as described above. For example, the kit K2 can include the movable barrier 112 and two of the attachment members 24 (two strips of the double-sided tape 30). It will be apparent to those skilled in the art from this disclosure that the double sided-tape 30 can be pre-attached to the movable barrier 112 with only one release sheet 31 disposed on the adhesive surface 30b of the base layer 30a to be removed by the user. It will also be apparent to those skilled in the art from this disclosure that the kit K2 can include a bottle of glue, screws, clips, and the like as the attachment member for the movable barrier 112.

Figure 10:
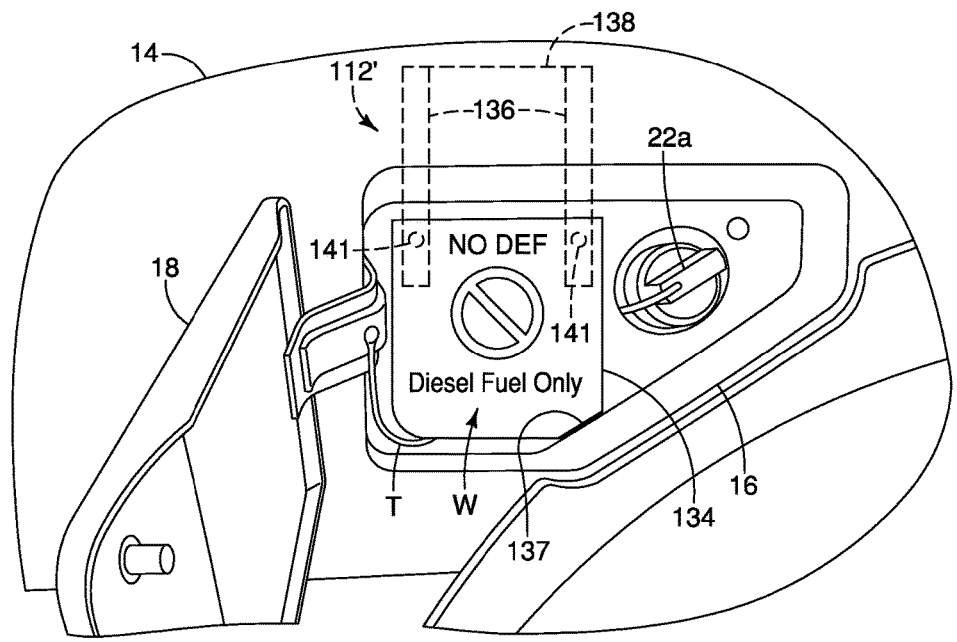
FIG. 10 is a partial elevational view of the side portion of the diesel vehicle having a movable barrier in accordance with the second illustrated embodiment in an inlet blocking position.
Figure 11:
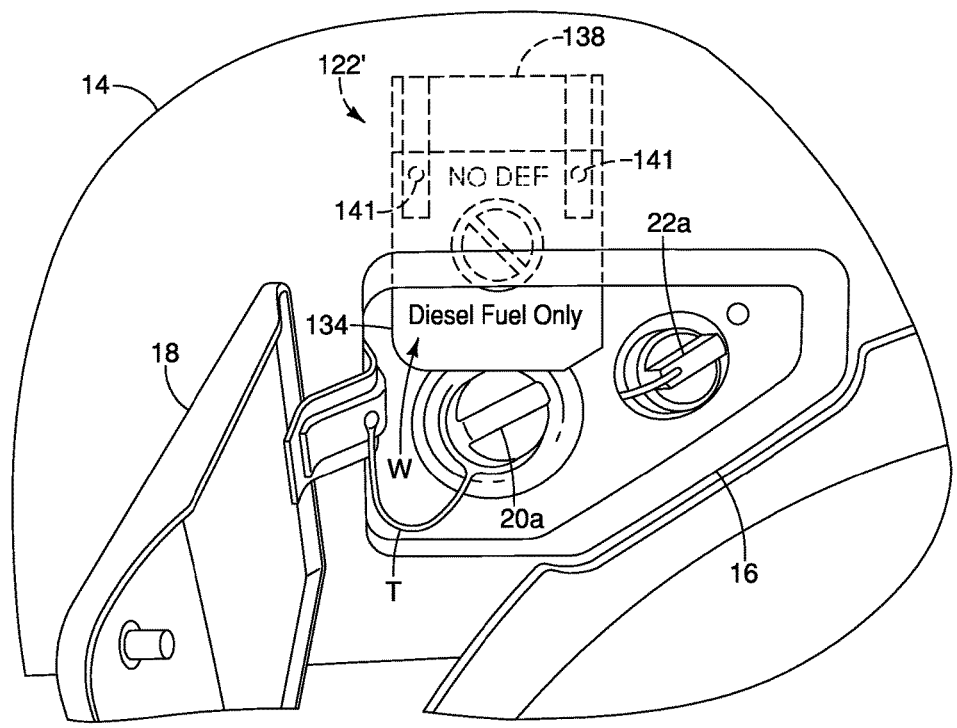
FIG. 11 is a partial elevational view, similar to FIG. 9, of the side portion of the diesel vehicle, but with the movable barrier being in an inlet accessible position.

Referring now to FIGS. 10 and 11, a movable barrier 112' of the second embodiment will now be discussed. The movable barrier 112' is basically identical to the movable barrier 112 except that the movable barrier 112' is mounted onto the vehicle 10 at a different location and operates based on gravity. Thus, the biasing elements S are omitted from the movable barrier 112'. Due to the similarity of the movable barrier 112' with respect to the movable barrier 112, corresponding components of the movable barrier 112' as the movable barrier 112 will receive identical reference numerals.

The base 132 of the modified movable barrier 112' is partially disposed through a cavity (not shown) in the body panel 14 that is vertically adjacent to the filler compartment 16. The connecting member 138 and the channels 136 are disposed on internal surfaces (not shown) of the cavity and the filler compartment 16. The channels 136 extend vertically from the cavity into the filler compartment 16. The barrier member 134 is vertically slidable to move between the filler compartment 16 and the cavity, so to move between an inlet blocking position (FIG. 10) and an inlet accessible position (FIG. 11).

In particular, the channels 136 each receive one of the protrusions 142 of the barrier member 134, respectively so that the barrier member 134 is vertically slidable in the channels 136. The base 132 of the movable barrier 112' does not include biasing elements S as mentioned above. The barrier member 134 is biased towards the inlet blocking position by gravity in which the barrier member 134 abuts a bottom surface 137 of the filler compartment 16, as seen in FIG. 10. The user slides the barrier member 134 in an upward direction into the cavity to access the first filler cap 20a.

The base 132 of the movable barrier 112' is attached to the vehicle 10 by the attachment member 24 identically as the attachment for the movable member 122 and will not be further discussed. The movable barrier 112' and the movable barrier 112 in accordance with the second embodiment do not need to be pre-mounted to the vehicle 10.

Referring now to FIGS. 12 to 16, a movable barrier 212 in accordance with a third embodiment is shown. The movable barrier 212 of the third embodiment is also configured to be attached to the body panel 14 of the vehicle 10 having the identical filler compartment 16 configuration as the first and second embodiments. Thus, for simplicity, components of the body panel 14 of the third embodiment will receive identical reference numerals as the previous embodiments. Components of the movable barrier 212 having corresponding components in the movable barrier 112 of the second embodiment will receive the same reference numeral but increased by 100. The movable barrier 212 is also configured to overlie the first filler cap 20a that receives diesel fuel and not the second filler cap 22a that receives DEF, and is designed to add a step into the user's fuel filling routine in order to prevent the user from mistakenly adding DEF into the first filler inlet tube 20.

Figure 12:
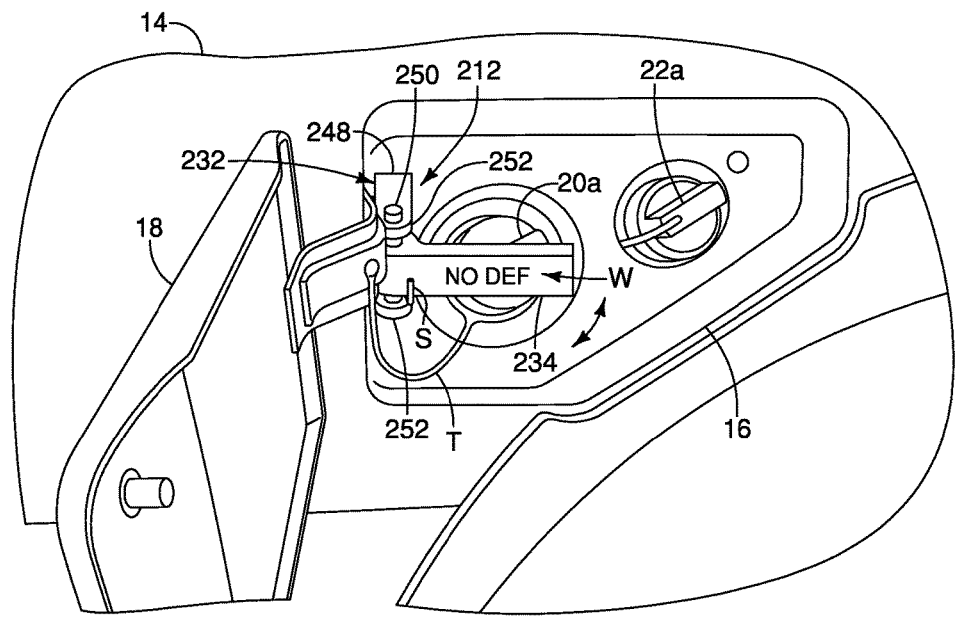
FIG. 12 is a partial elevational view of the side portion of the diesel vehicle having a movable barrier in accordance with a third embodiment, the movable barrier being disposed in the filler compartment in an inlet blocking position.
Figure 13:
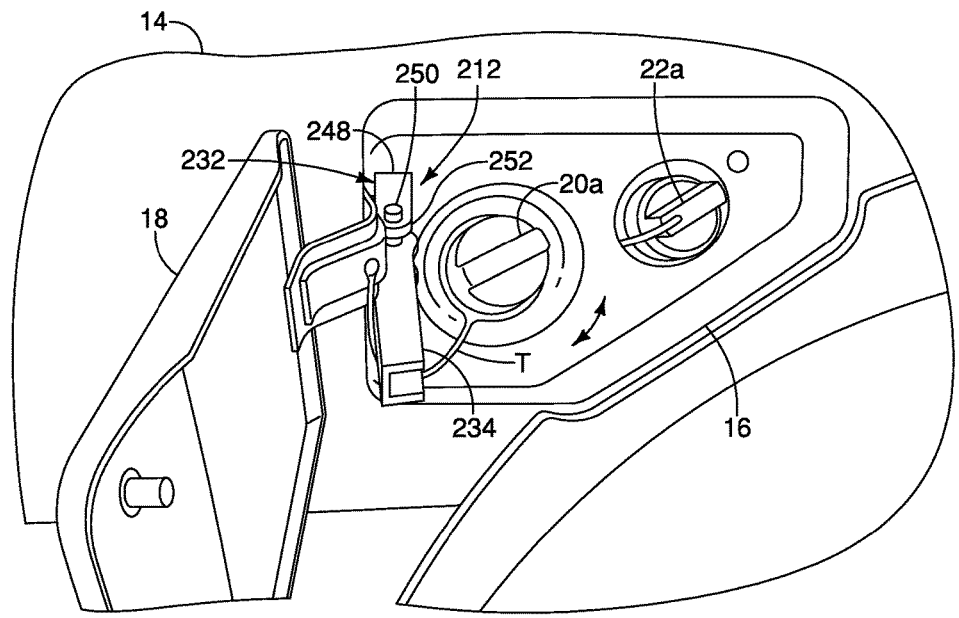
FIG. 13 is a partial elevational view, similar to FIG. 12, of the side portion of the diesel vehicle, but with the movable barrier being in an inlet accessible position.

The movable barrier 212 includes a base 232, a barrier member 234 and the attachment member 24. The movable barrier 212 of the third embodiment is configured to be attached to the filler compartment 16 at a location adjacent to the first filler inlet tube 20. The barrier member 234 is configured to overlie the first filler cap 20a at a rest position that corresponds to an inlet blocking position (FIG. 12). The barrier member 234 is preferably a rigid bar having indicia W that is movably arranged relative to the base 232 to move between an inlet accessible position (FIG. 13) to access the first filler cap 20a and the inlet blocking position that blocks the first filler cap 20a (FIG. 12). In the movable barrier 212, the barrier member 234 is pivotally arranged relative to the base 232 to move between the inlet accessible position and the inlet blocking position. Thus, the barrier member 234 of the third embodiment includes a rigid hinged member.

The base 232 includes a backing plate 248, a pin 250 and a biasing element S. The backing plate 248 includes a pair of flanges 252, each having a through hole 252a. The barrier member 234 includes a through hole 234a extending through a mounting portion 254 of the barrier member 234. The biasing element S is arranged about the pin 250 which extends through the through holes 252a of the backing plate 248 and the through hole 234a of the barrier member 234 to movably secure the barrier member 234 to the backing plate 248. Preferably, the base 232 and the barrier member 234 are constructed of carbon impregnated plastic. It will be apparent to those skilled in the art from this disclosure that the base 232 and barrier member 234 can be constructed of other types of rigid material that has a low electrical conductivity, as needed and/or desired.

Figure 14:
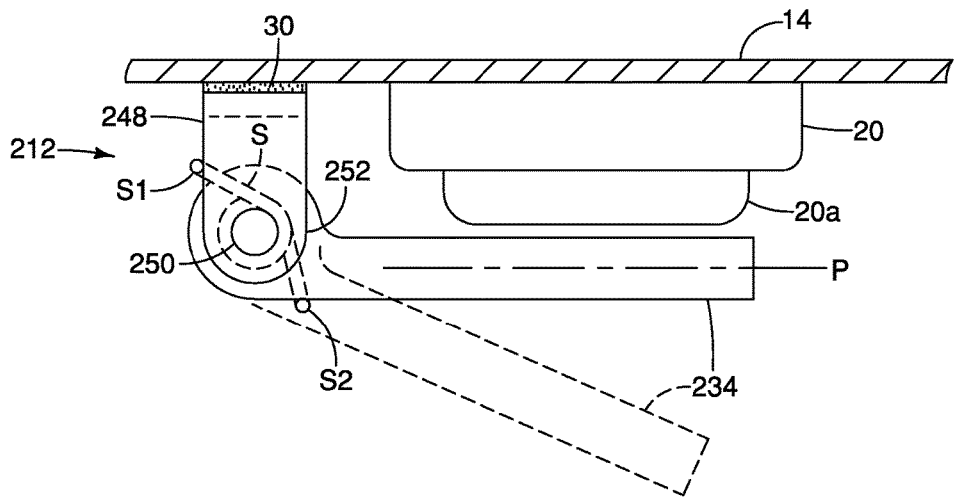
FIG. 14 is a partial simplified cross sectional view of the filler compartment of the diesel vehicle with the fuel filler cap and the movable barrier illustrated in FIGS. 12 and 13 shown in elevation.

The barrier member 234 is biased by the biasing element S of the base 232. As best seen in FIG. 14, a first end S1 of the biasing element S abuts the backing plate 248 and a second end S2 of the basing spring S abuts a bottom surface of the barrier member 234. In the third embodiment as shown, the biasing element S is a torsion spring. It will be apparent to one skilled in the art from this disclosure that the biasing element S can be an alternate type of spring, such as a clock spring, as needed and/or desired.

To access the first filler cap 20a, the user pivots the barrier member 234 about the pin 250 away from a plane P having the first filler cap 20a, as shown in FIG. 14. It will be apparent to those skilled in the art from this disclosure that the barrier member 234 and the biasing element S can be alternatively arranged about the pin 250 so that the barrier member 234 pivots in a variety of directions with respect to the base 232, such as circumferentially about the pin 250, as needed and/or desired.

Figure 15:
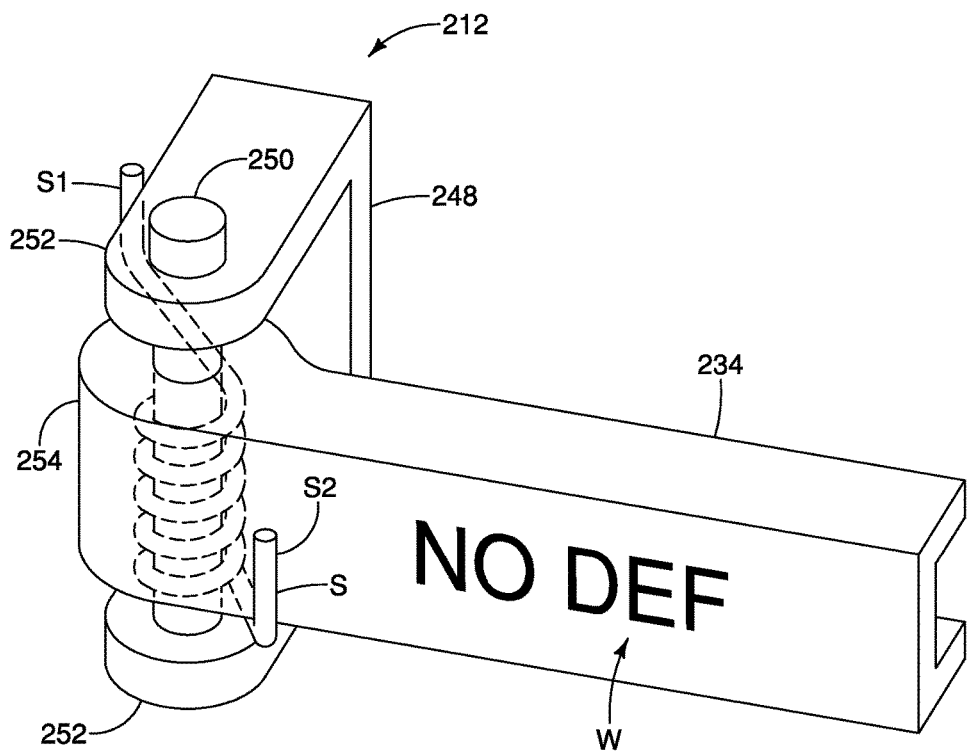
FIG. 15 is a front perspective view of the movable barrier illustrated in FIGS. 12 to 14.
Figure 16:
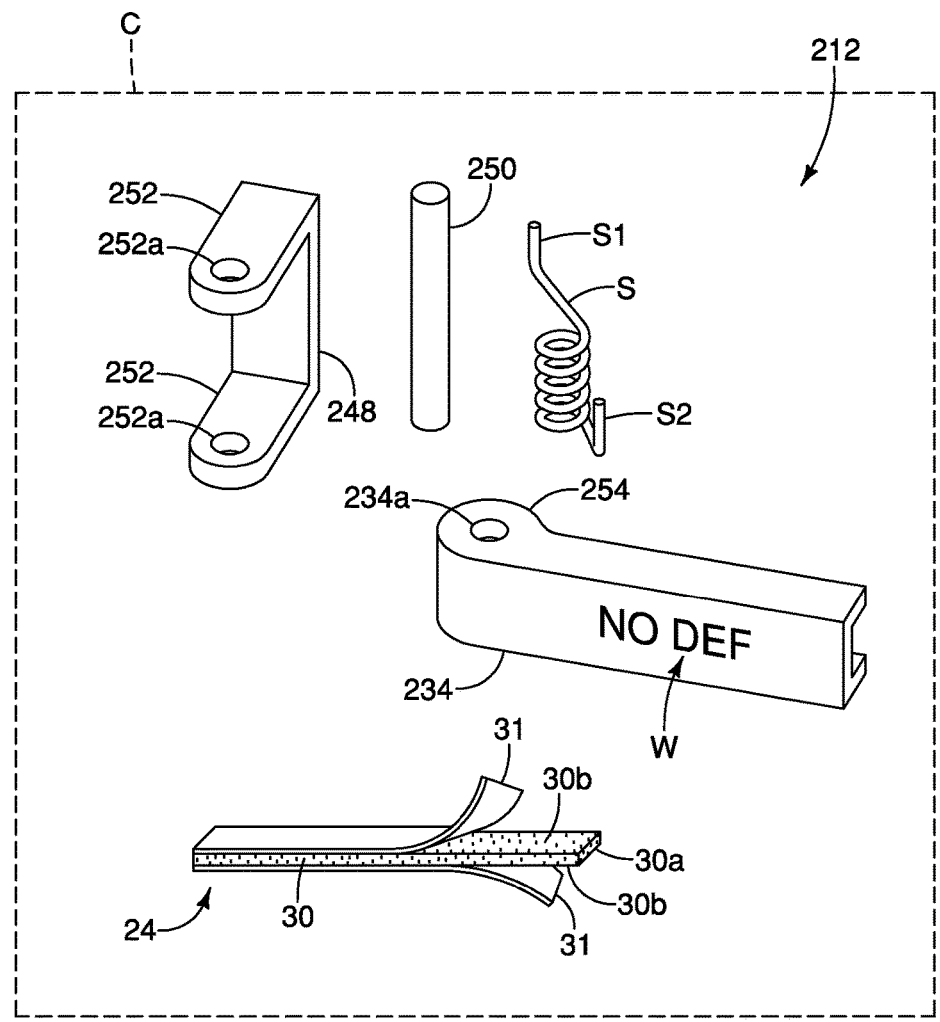
FIG. 16 is a simplified diagrammatic view of a fuel cap barrier kit having the movable barrier illustrated in FIGS. 12 to 15 and the attachment member for installing the movable barrier to a diesel vehicle.

The attachment member 24 of the movable barrier 212 includes an adhesive such as the double-sided tape 30 that affixes the backing plate 248 to the surface of the filler compartment 16. The movable barrier 212 of the third embodiment does not need to be pre-mounted to the body panel 14. Instead, as illustrated in FIG. 15, the movable barrier 112 can be part of a kit K3 that is to be assembled to the body panel 14 as described above. For example, the kit K3 can include the movable barrier 212 and the attachment member 24, illustrated as a strip of the double-sided tape 30. It will be apparent to those skilled in the art from this disclosure that the double-sided tape 30 can be pre-attached to the backing plate 248 with one release sheets 31 disposed over an adhesive surface 30b of the base layer 30a to be removed by the user to mount the backing plate 248 to the filler compartment 16. It will also be apparent to those skilled in the art from this disclosure that the kit K3 can include a bottle of glue, screws, clips, and the like as the attachment member 24 for the movable barrier 212.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "area", "part," "section," "portion," "member" or "element" when used in the singular can have the dual meaning of a single part or a plurality of parts. Also as used herein to describe the above embodiment(s), the following directional terms "lateral" and "vertical" as well as any other similar directional terms refer to those directions of a vehicle equipped with the movable barrier. Accordingly, these terms, as utilized to describe the present invention should be interpreted relative to a vehicle equipped with the movable barrier.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A fuel cap barrier kit comprising:
a movable barrier having a base portion dimensioned and structured to be attached to a vehicle body at a location in which the movable barrier is disposed in front of a fuel cap and is underneath a filler compartment door, the movable barrier being movable between an inlet accessible position in which the movable barrier permits user access to the fuel cap and an inlet blocking position in which the movable barrier is disposed in front of the fuel cap; and
an attachment member configured to fixedly attach the movable barrier to the vehicle body, the attachment member including an adhesive for attaching the base portion to the vehicle body.

2. The fuel cap barrier kit according to claim 1, wherein the movable barrier includes indicia indicative of a warning message to a user.

3. The fuel cap barrier kit according to claim 1, wherein the movable barrier includes a flexible sheet material.

4. The fuel cap barrier kit according to claim 1, wherein the adhesive is provided on a backing material to form double-sided tape.

5. The fuel cap barrier kit according to claim 4, wherein the double-sided tape is pre-attached to the flexible sheet material.

6. The fuel cap barrier kit according to claim 1, wherein the movable barrier includes a spring-loaded assembly having a base that includes the base portion that is configured to be attached to the vehicle body by the attachment member, and a barrier member that is movable with respect to the base between the inlet accessible position and the inlet blocking position.

7. The fuel cap barrier kit according to claim 6, wherein the base includes at least one biasing element configured to bias the barrier member into the inlet blocking position when the movable barrier is attached to the vehicle body.

8. The fuel cap barrier kit according to claim 7, wherein the barrier member includes a rigid slidable member.

9. The fuel cap barrier kit according to claim 7, wherein the barrier member includes a rigid hinged member.

10. The fuel cap barrier kit according to claim 6, wherein the adhesive includes double sided tape that is pre-attached to the base.

11. A vehicle body comprising:
a vehicle body panel including a filler compartment having a first filler inlet with a first cap, a second filler inlet with a second cap and a compartment door movably arranged between a closed position overlying the first and second caps and an open position exposing the first and second caps;
a movable barrier having a base portion that is attached to the vehicle body panel, the movable barrier being disposed underneath the filler compartment door when the door is in the closed position, the movable barrier being movable between an inlet accessible position in which the movable barrier permits user access to the first cap and an inlet blocking position in which is disposed in front of the first cap; and
an attachment member fixedly attaching the movable barrier to the vehicle body panel, the attachment member including an adhesive for attaching the base portion to the vehicle body panel.

12. The vehicle body according to claim 11, wherein the movable barrier includes indicia indicative of a warning message to a user.

13. The vehicle body according to claim 11, wherein the first filler inlet is configured to receive diesel fuel and the second filler inlet is configured to receive diesel exhaust fluid, the movable barrier being disposed in front of the first cap and not the second cap when the movable barrier is in the rest position.

14. The vehicle body according to claim 13, wherein the movable barrier is a flexible sheet material.

15. The vehicle body according to claim 13, wherein the movable barrier is a spring-loaded assembly having a base attached to the vehicle body panel by the attachment member and a barrier member that is movable with respect to the base between the inlet accessible position and the inlet blocking position.

16. The vehicle body according to claim 15, wherein the base includes at least one biasing element biasing the barrier member towards the inlet blocking position.

17. The vehicle body according to claim 15, wherein the barrier member is at least one of a rigid slidable barrier and a rigid hinged barrier.

* * * * *